Figure 1:
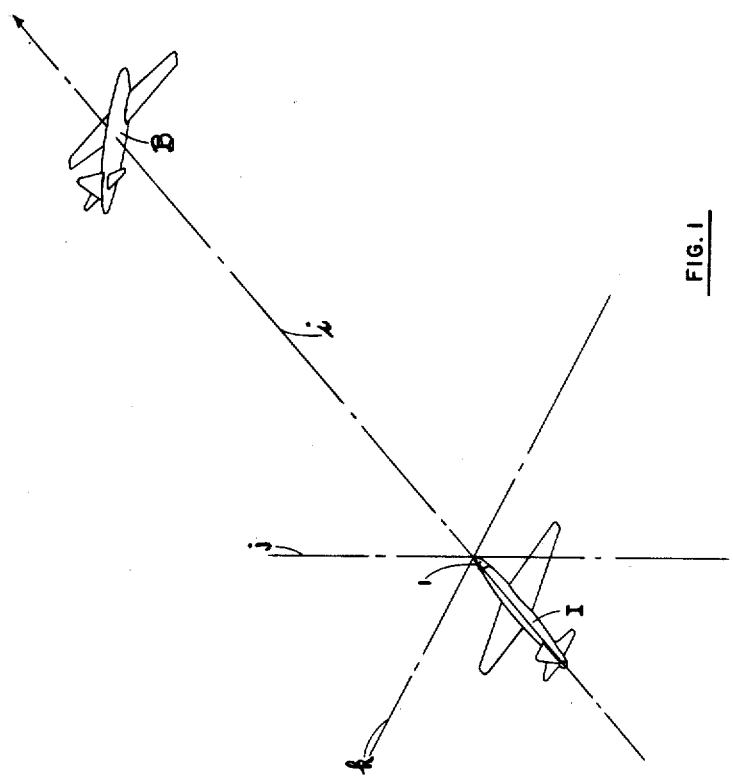

Sept. 3, 1957

R. G. SHELLEY 2,805,022

VECTOR FILTER SYSTEM

Filed June 25, 1951

2 Sheets-Sheet 1

INVENTOR.
RULON G. SHELLEY
BY
*William R. Lane*
ATTORNEY

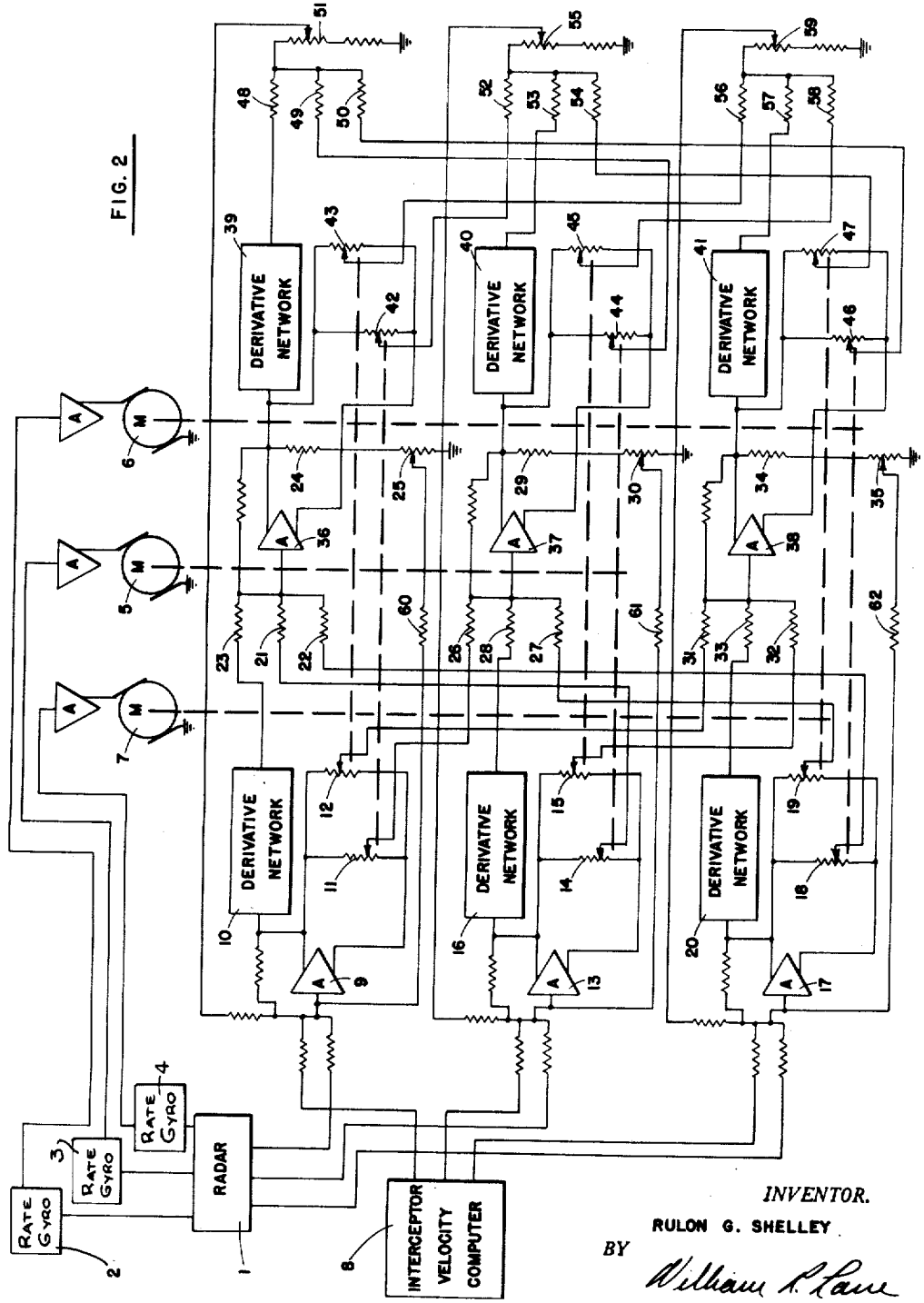

United States Patent Office 2,805,022
Patented Sept. 3, 1957

2,805,022

VECTOR FILTER SYSTEM

Rulon G. Shelley, Downey, Calif., assignor to North American Aviation, Inc.

Application June 25, 1951, Serial No. 233,388

14 Claims. (Cl. 235—61.5)

This invention relates to data smoothing, and particularly to smoothing of a vector quantity expressed in a coordinate system which is rotating in space.

The problem solved by this invention is posed in the following example although obviously the invention may be used to smooth any vector quantity as though it were expressed in a non-rotating coordinate system without its being expressed in other than a rotating coordinate system. An interceptor airplane has detected a bomber or target airplane by means of radar, and in order to solve fire control and other related interceptor problems it is necessary to determine the bomber velocity. Bomber velocity is determined by training a radar carried by the interceptor upon the bomber, and by determining the rate at which the target range vector is changing, both in magnitude and in direction. Due to limitations inherent in the radar system, and the transmission and reception of radar signals, the signal developed by the radar has in it spurious variations called "noise" which must be reduced or filtered out. In radar and other electronic devices generally, it is common practice to filter out noise and other unwanted signals by amplifying the incoming signal and feeding back to the input of the amplifier a portion of the derivative of the output of the amplifier. However, in the example under consideration the coordinate system in which the range vector to the bomber is measured is not fixed in space, but is rotating, since the radar apparatus used to measure the bomber velocity vector is, in general, rotating and translating in space. Consequently a simple derivative feedback filter would yield a component of feedback due solely to rotation of the coordinate system of the radar. This is an undesirable result, since it would introduce possibly worse errors than the noise it would eliminate. As solutions to the problem it has been proposed to transform the bomber velocity vector from radar coordinates to inertial coordinates, smooth or filter the vector in inertial coordinates, and then transform the result back to radar coordinates where the information represented by the vector may be used in solving the fire control problems. This solution necessitates bulky and heavy computer components for the transformations required. In addition, a certain loss of precision is suffered by virtue of the double transformation. The present invention contemplates a system for smoothing the target velocity vector in a manner equivalent to smoothing in a non-rotating coordinate system without transforming the vector from one coordinate system to the other. The basic idea involved in this invention is the recognition of the target velocity vector as a true vector quantity with direction as well as magnitude.

It is therefore an object of this invention to provide apparatus for smoothing a vector quantity expressed in a coordinate system which is rotating.

It is another object of this invention to provide a vector filter which takes into account rotation of the coordinate system.

It is another object of this invention to provide a vector filter having a variable transfer function.

Other objects of invention will become apparent from the following description taken in connection with the accompanying drawings in which, Fig. 1 is a perspective view of the interceptor and bomber with which this invention is used, together with the coordinate system;

And Fig. 2 is a schematic diagram of the invention.

In Fig. 1 an interceptor I carries radar apparatus 1 in its nose, which radar system has coordinate axes denoted $i$, $j$, and $k$, where the $i$ axis is always the line of sight from the radar to a target bomber B. Axes $i$, $j$, and $k$ are mutually orthogonal axes.

Referring now to Fig. 2, radar apparatus 1 yields the following voltages: $r$, which is the rate at which the interceptor is closing the bomber in range; $r\omega_j$, which is the product of the range to the bomber and the angular rate of the target about the $j$ axis; and $r\omega_k$, which is the product of the range and the angular rate of the target about the $k$ axis. These three voltages are the scalar quantities which when combined represent the bomber velocity vector relative to the interceptor. Radar apparatus 1 also carries rate gyros 2, 3, and 4 which yield voltages proportional to the angular rates of the radar apparatus about the $j$, $k$, and $i$ axes with respect to inertial coordinates. Gyroscopes 2, 3 and 4 may be physically mounted, for example, on the antenna of the radar. These voltages are fed to servomotors 5, 6, and 7 which produce shaft outputs precisely proportional to $\omega_k$, $\omega_j$, $\omega_i$, the angular rates of the radar system about the $k$, $j$, and $i$ axes, respectively, with respect to a non-rotating coordinate system. Also carried by the interceptor is interceptor velocity computer 8, whose outputs are $V_{Ii}$, $V_{Ij}$, and $V_{Ik}$, which are the components of interceptor velocity along the $i$, $j$, and $k$ axes of the radar coordinate system. When these components are combined vectorially, of course, they yield the interceptor velocity vector. To summarize, the radar yields voltages which when combined vectorially yield the target velocity vector relative to the interceptor; and the interceptor velocity computer yields voltages which when combined vectorially yield the interceptor velocity vector with respect to a non-rotating coordinate system. If these two vectors are added the resultant is the true target velocity with respect to inertial space. This vector is useful for computing fire control problems of the interceptor. However, as previously explained, it is highly desirable that the voltages representative of the bomber absolute velocity be smoothed or filtered to reduce noise. Again, as previously pointed out, if these quantities are smoothed merely by feeding back a derivative of the voltages, false signals due to rotation of the radar coordinate system will be introduced. In accordance with this invention this smoothing operation is accomplished without introducing such errors, by taking into account rotation of the radar coordinate system. In Fig. 2 a voltage proportional to $r$ is added a voltage proportional to $V_{Ii}$ and fed to amplifier 9, the output of which, then, is a voltage $V_{Bi}$ proportional to the component of target velocity along the $i$ axis. Amplifier 9 is so arranged that both a positive and a negative voltage proportional to $V_{Bi}$ are generated as the outputs thereof. This positive voltage is fed to derivative network 10 which yields an output voltage proportional to the derivative of $V_{Bi}$. The positive and negative outputs of amplifier 9 are connected to the opposite posts of potentiometers 11 and 12, the wipers of which are shaft-connected to servos 5 and 6 so that they are turned to positions proportional to $\omega_k$ and $\omega_j$. The output of these potentiometers is therefore proportional to $\omega_k V_{Bi}$ and $\omega_j V_{Bi}$, respectively.

In a similar manner a voltage proportional to $r\,\omega_k$ from the radar, and a voltage proportional to $V_{ij}$ from the interceptor velocity computer are combined and fed to amplifier 13, the outputs of which are then $+V_{Bj}$ and $-V_{Bj}$, which outputs are connected to the terminals of potentiometers 14 and 15, the wipers of which are turned to positions proportional to the angular rates $\omega_k$ and $\omega_i$. The positive output of amplifier 13 is also connected to derivative network 16 which yields an output proportional to the derivative of $V_{Bj}$.

Finally, a voltage from the radar proportional to $r\,\omega_j$ and a voltage from the interceptor velocity computer proportional to $V_{ik}$ are combined and fed to amplifier 17 whose output voltages are then $+V_{Bk}$ and $-V_{Bk}$, which outputs are connected to the terminals of potentiometers 18 and 19 whose wipers are turned to positions proportional to the angular rates $\omega_j$ and $\omega_i$, respectively. The outputs of these potentiometers are then proportional to $\omega_j V_{Bk}$ and $\omega_i V_{Bk}$, respectively. A positive voltage proportional to $V_{Bk}$ is also fed to derivative network 20 whose output is then a voltage proportional to the derivative of $V_{Bk}$.

The outputs of potentiometers 14 and 18, being $\omega_k V_{Bjs}$ and $\omega_j V_{Bks}$, respectively, are added to the outputs of derivative network 10 through resistances 21, 22, and 23, respectively. The combined voltage is then fed through resistance 24 and potentiometer 25 back to the input of amplifier 9. The subscript "$s$" above indicates that the term to which it is applied is a smoothed quantity. This smoothing is effected by the feedback process just described so that derivative network 10 and the derivative networks to be described subsequently actually operate upon a smoothed velocity component.

Similarly, the outputs of potentiometers 11 and 19, being $\omega_k V_{Bis}$ and $\omega_i V_{Bks}$, respectively, are added to the voltage output of derivative network 16 through resistances 26, 27, and 28 and fed to resistance 29 and potentiometer 30 and thence to the input of amplifier 13.

Finally, the outputs of potentiometers 12 and 14, being voltages proportional to $\omega_j V_{Bis}$ and $\omega_i V_{Bjs}$, are added to the voltage output of derivative network 20 through resistances 31, 32, and 33 and thence fed through resistance 34 and potentiometer 35 to the input of amplifier 17.

To appreciate what is accomplished by the circuitry just discussed it is helpful to consider the mathematical operations which have been performed. Briefly, what has been accomplished is that the target velocity vector has been smoothed by introducing a feedback term proportional to the true vector derivative of the smoothed target velocity. The vector derivative of the target velocity may be represented as follows:

$$\dot{\vec{V}}_{Bs} = \frac{\partial(\vec{V}_{Bs})}{\partial_t} + (\vec{\omega} \times \vec{V}_{Bs})$$

where the subscript "$s$" indicates that the vector is smoothed. The vector derivative of smoothed target velocity has been split into components along the $i$, $j$, and $k$ axes, respectively, and as such may be represented as the sum of various scalar quantities as indicated in the following equations:

$$(\dot{\vec{V}}_{Bs})_i = \dot{V}_{Bis} + \omega_j V_{Bks} - \omega_k V_{Bjs}$$

$$(\dot{\vec{V}}_{Bs})_j = \dot{V}_{Bjs} + \omega_k V_{Bis} - \omega_i V_{Bks}$$

$$(\dot{\vec{V}}_{Bs})_k = \dot{V}_{Bks} + \omega_i V_{Bjs} - \omega_j V_{Bis}$$

Since the true vector derivative has been taken rather than a mere scalar derivative, true filtering of the target velocity vector has been accomplished. Signals representing the vector derivatives of the components of smooth target velocity along the three axes may be taken at the junctions of resistors 21, 22 and 23; resistors 26, 27 and 28; and resistors 31, 32 and 33. More complete smoothing may of course be accomplished by extending the theory of this invention to second and third derivatives with feedback to the inputs of amplifiers 9, 13, and 17. Referring again to Fig. 2, amplifiers 36, 37, and 38 are connected as shown to the junction between resistances 21, 22, and 23, 26, 27, and 28, and resistances 31, 32, and 33, respectively. The inputs to derivative networks 39, 40, and 41 are therefore proportional to $\dot{\vec{V}}_{is}$, $\dot{\vec{V}}_{ks}$, and $\dot{\vec{V}}_{js}$, respectively. If $\dot{\vec{V}}_s$ is defined as equal to $\vec{A}_s$, then the output of derivative networks 39, 40, and 41 will be $\dot{\vec{A}}_{is}$, $\dot{\vec{A}}_{js}$, and $\dot{\vec{A}}_{ks}$. The wipers of potentiometers 43, 43, 44, 45, 46, and 47 are shaft-connected as shown in Fig. 2 to servos 5, 6, and 7. The outputs of potentiometers 44 and 46 are, therefore, the product of $\omega_k \vec{A}_{Bjs}$ and $\omega_j \vec{A}_{Bks}$, respectively. Voltages proportional to these potentiometer outputs are added to the output of derivative network 39 via resistances 48, 49, and 50, and a suitable portion thereof is furnished to the input of amplifier 9, said proportion being determined by the size of resistance 51.

Similarly, the outputs of potentiometers 42 and 44, being proportional to $\omega_k \vec{A}_{Bis}$ and $\omega_j \vec{A}_{Bks}$, are added to the output of derivative network 40 via resistances 52, 53, and 54 and fed to the input of amplifier 13 in a proportion determined by the size of resistance 55.

Finally, the outputs of potentiometers 43 and 45, being $\omega_j \vec{A}_{Bis}$ and $\omega_j \vec{A}_{Bjs}$, respectively, are added to the output of derivative network 41 by means of resistances 56, 57, and 58 and a portion, determined by the size of resistance 59, of this sum is fed to the input of amplifier 13.

To summarize, the target velocity vector has been further smoothed by introducing a feedback term proportional to the true vector derivative of the smoothed target acceleration. The vector derivative of the smoothed target acceleration may be represented as follows:

$$\dot{\vec{A}}_{Rs} = \frac{\partial(\dot{\vec{V}}_{Bs})}{\partial t} + (\vec{\omega} \times \dot{\vec{V}}_{Bs})$$

The vector derivative of target acceleration has been split into components along the $i$, $j$, and $k$ axes, respectively, and as such may be represented as the vector sum of various scalar quantities as indicated in the following equations:

$$(\dot{\vec{A}}_{Bs})_i = \frac{d}{dt}(\dot{\vec{V}}_{Bs})_i + \omega_j(\dot{\vec{V}}_{Bs})_k - \omega_k(\dot{\vec{V}}_{Bs})_j$$

$$(\dot{\vec{A}}_{Bs})_j = \frac{d}{dt}(\dot{\vec{V}}_{Bs})_j + \omega_k(\dot{\vec{V}}_{Bs})_i - \omega_i(\dot{\vec{V}}_{Bs})_k$$

$$(\dot{\vec{A}}_{Bs})_k = \frac{d}{dt}(\dot{\vec{V}}_{Bs})_k + \omega_i(\dot{\vec{V}}_{Bs})_j - \omega_j(\dot{\vec{V}}_{Bs})_i$$

The apparatus which is described performs the foregoing computations in order to achieve second derivative smoothing.

The signals representing vector derivatives of smooth target acceleration along the component axes may be obtained at the junction of resistors 48, 49 and 50; 52, 53 and 54; 56, 57 and 58. By a suitable choice of the relative sizes of resistances 60, 61, and 62 in relation to resistances 51, 55, and 59, any weighting of the resultant smoothing between first derivative smoothing and second derivative smoothing may be accomplished. If the whole circuit shown in Fig. 2 is regarded as a filter, it may be said that a transfer function equivalent to $$\frac{1}{1 + K_1 \bar{P} + K_2 \bar{P}^2}$$

may be achieved, where $K_1$ and $K_2$ may be varied by adjusting the values of resistances 60, 51, and 62, 51, 55, and 59, and $\bar{P}$ is defined as a vector differential operator.

By extension of the filter to three or more stages, almost any transfer function may be achieved for the resulting filter.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Means for filtering a vector quantity expressed in a coordinate system free to rotate in space comprising means for producing signals expressive of said vector quantity and proportional to the components of said vector quantity referred to said coordinate system, means for producing signals expressive of time derivatives of the magnitude of said components, means for producing signals expressive of the effect of the rotation of said coordinate system upon said vector quantity and means for combining said time derivative signals and said signals expressive of the effect of the rotation of said coordinate system upon said vector quantity to provide a signal representing said vector quantity expressed in a nonrotating coordinate system.

2. Means for filtering a vector quantity expressed in terms of three electrical signals each proportional to a component of said quantity in a coordinate system free to rotate in space comprising means for producing signals proportional to the time derivatives of said signals, means for producing rate signals proportional to the components of angular rotation of said coordinate system, means for computing, from said rate signals and said component signals, signals defining the derivative of said vector quantity, and feedback means for combining said component signals and said derivative signals to thereby filter said vector quantity.

3. A device as recited in claim 2 in which said means for producing signals proportional to the components of angular rotation of said coordinate system comprises a plurality of rate gyroscopes rigidly associated with said rotating coordinate system.

4. A device as recited in claim 2 in which said means for computing said vector derivative signals comprises electromechanical means for producing signals proportional to the alpebraic sum of the time derivative of each said signal proportional to a component of said vector quantity along each axis of said coordinate system and the cross products of the signals proportional to the angular velocities of said coordinate system about the other axes of said coordinate system and said signal proportional to the component of said vector quantity along said other axes.

5. Means for filtering a vector quantity expressed as signals proportional to its components along the three axes of a Cartesian coordinate system rotating in space comprising means for producing signals proportional to the time derivatives of said component signals, means for generating signals proportional to the angular velocity of said coordinate system about each of said three axes, means responsive to said component signals and said derivative signals for producing signals proportional to the algebraic sums of the time derivatives of the components of said vector quantity along each said axis and the cross products of the angular velocity of said coordinate system about the other said axes and the component of said vector quantity along said other axes, and feedback means for combining each said component signal with a corresponding algebraic sum signal to thereby filter said vector quantity.

6. A device as recited in claim 5 in which said means for generating signals proportional to angular velocity comprises three rate gyroscopes each responsive to rotations about one of said axes to thereby measure angular velocity of said coordinate system with respect to a nonrotating coordinate system.

7. A device as recited in claim 5 in which said vector quantity is expressed as an electrical quantity and in which said means for producing signals proportional to the algebraic sum of the scalar derivatives of the components of said vector quantity along each said axis and the cross-products of the angular velocity of said coordinate system about the other said axes and the component of said vector quantity along said other axes comprises means responsive to said means for generating signals proportional to the angular velocity of said coordinate system for producing a shaft rotation proportional to each of the components of angular velocity of said coordinate system about each of said axes, a pair of potentiometers attached to be driven by each said shaft with each said potentiometer having its fixed terminals connected to receive said component signal corresponding to the component of said vector quantity along an axis other than the axis about which the angular rotation of said shaft expresses the angular velocity of said coordinate system, a second pair of potentiometers attached to be driven by each said shaft with each potentiometer having its fixed terminals connected to receive a signal proportional to the component of said vector quantity along an axis other than the two aforementioned axes, and a plurality of summing resistances connected to add the output of each said potentiometer to the output of a potentiometer driven by another of said shafts and to the signal proportional to the time derivative of the component of said vector quantity along an axis other than the axes the angular velocity of said coordinate system about which said last-named potentiometers are driven an angular rotation proportional to, the output of each said potentiometer being so added but once, whereby a sum signal is produced to be combined with each said signal proportional to a component of said vector quantity to thereby vectorially filter said vector quantity.

8. Means for filtering a vector quantity expressed in terms of electrical signals in a rotating coordinate system as though expressed in a nonrotating coordinate system comprising means for producing electrical signals expressive of the vector derivative of the filtered vector quantity, taking into account the rotation of said coordinate system, means for vectorially subtracting a proportion of said vector derivative signals from said vector quantity signals to thereby filter said vector quantity.

9. A vector filter having a predetermined transfer function for filtering a vector quantity expressed as electrical signals defining its components in a rotating coordinate system as though said signals defined its components in a nonrotating coordinate system, comprising means for producing electrical signals expressive of preselected order derivatives of said vector quantity, means for vectorially subtracting predetermined proportions of each of said derivative signals from said vector quantity signals including signals expressive of the vector cross-products of said signals to thereby filter said vector quantity with a predetermined transfer function.

10. Means for filtering a vector quantity expressed in a coordinate system free to rotate comprising means for producing an electrical signal proportional to the component of said vector along a first axis of said coordinate system; means for producing an electrical signal proportional to the component of said vector along the second axis of said coordinate system; means for producing an electrical signal proportional to the component of said vector along a third axis of said coordinate system; means for producing a signal proportional to the time derivative of said first component signal; means for producing an electrical signal proportional to the time derivative of said second component signal; means for producing an electrical system proportional to the time derivative of said third component signal; means for producing an electrical signal proportional to the angular rate of said coordinate system about said first axis; means for producing an electrical signal proportional to the angular rate of said coordinate system about said second axis; means for producing an electrical signal proportional to the angular rate of said coordinate system about said third axis; means for producing a first sum signal proportional to the sum of said first component signal, said first derivative signal, the product of said second component signal and said third rate signal, and the product of said third component signal and said second rate signal; means for producing a second sum signal proportional to the algebraic sum of said second component signal, said second derivative signal, the product of said first component signal and said third rate signal, and the product of said third component signal and said first rate signal; and means for producing a sum signal proportional to the sum of said third component signal, said third derivative signal, the product of said first component signal and said second rate signal, and the product of said second component signal and said first rate signal, whereby the resultant of said three sum signals is representative of a vector corresponding to said vector quantity filtered.

11. Means for filtering a vector quantity expressed in terms of three electrical signals each proportional to a component of said quantity in a coordinate system free to rotate in space comprising means for producing signals proportional to the time derivatives of said signals; means for producing rate signals proportional to the components of angular rotation of said coordinate system; means for computing from said time derivatives of said component signals, said rate signals, and said component signals, signals defining the derivative of said vector quantity; and feedback means for combining said signals defining the derivative of said vector quantity with said electrical signals proportional to the components of said vector quantity to thereby filter each said component signal.

12. Means for filtering a vector quantity expressed as signals proportional to its components along the three axes of a Cartesian coordinate system rotating in space comprising means for producing signals proportional to the time derivatives of said component signals, means for generating signals proportional to the angular velocity of said coordinate system about each of said three axes, algebraic summing means responsive to said time derivative of a component of said vector quantity along each said axes and the cross-products of said signals proportional to angular velocity of said coordinate system about the other said axes and the components of said vector quantity along said other axes, and feedback means for combining each said component signal with its corresponding algebraic sum signal to thereby filter said vector.

13. Means for filtering a vector quantity V expressed as signals proportional to its components $V_{Bi}$, $V_{Bj}$ and $V_{Bk}$ along three axes $i$, $j$ and $k$ of a Cartesian coordinate system rotating in space comprising means for generating signals proportional to the angular velocity of said coordinate system resolved into components $\omega_i$, $\omega_j$ and $\omega_k$ about each of said three axes, means for filtering said components $V_{Bi}$, $V_{Bj}$ and $V_{Bk}$ to provide smooth components $V_{Bis}$, $V_{Bjs}$ and $V_{Bks}$, means for receiving said smooth components and said angular velocity signals and for producing cross-product signals proportional respectively to $(\omega_j V_{Bks} - \omega_k V_{Bjs})$, $(\omega_k V_{Bis} - \omega_i V_{Bks})$ and $(\omega_i V_{Bjs} - \omega_j V_{Bis})$, derivative means for providing signals representing $\dot{V}_{Bis}$, $\dot{V}_{Bjs}$ and $\dot{V}_{Bks}$ from said components $V_{Bis}$, $V_{Bjs}$ and $V_{Bks}$, means for combining the signals represented by the above terms to provide signals representing the following equations:

$$(\vec{V}_{Bs})i = \dot{V}_{Bis} + \omega_j V_{Bks} - \omega_k V_{Bjs}$$

$$(\vec{V}_{Bs})j = \dot{V}_{Bjs} + \omega_k V_{Bis} - \omega_i V_{Bks}$$

$$(\vec{V}_{Bs})k = \dot{V}_{Bks} + \omega_i V_{Bjs} - \omega_j V_{Bis}$$

whereby the true vector derivative of said vector quantity V is obtained in a nonrotating coordinate system.

14. Means for filtering a vector quantity expressed as signals proportional to its components along the first, second and third axes of a Cartesian coordinate system rotating in space comprising means for producing electrical signals proportional to the angular velocity of said coordinate system about each of said first, second and third axes; means responsive to said component signals and said velocity signals for producing first, second and third cross-product signals proportional respectively to the product of said component along said third axis and said angular velocity about said second axis less the product of said angular velocity about said third axis and said component along said second axis, the product of said third angular velocity and said first component less the product of said first angular velocity and said third component, and the product of said first angular velocity and said second component less said second angular velocity and said first component; means for obtaining the derivatives of said first, second, and third component signals and first, second and third filter means receiving said signals representing the derivative of first, second and third component signals respectively, and said first, second and third cross-product signals respectively for producing signals proportional to the smoothed components of said vector quantity.

References Cited in the file of this patent

UNITED STATES PATENTS

| | | |
|---|---|---|
| 1,436,280 | Olinorsky | Nov. 21, 1922 |
| 2,257,757 | Moselay | Oct. 7, 1941 |
| 2,401,421 | Hahn | June 4, 1946 |
| 2,437,313 | Bedford | Mar. 9, 1948 |
| 2,448,564 | Wilkerson | Sept. 7, 1948 |
| 2,492,351 | Bode | Dec. 27, 1949 |
| 2,493,183 | Boghosian et al. | Jan. 3, 1950 |
| 2,548,278 | Workler | Apr. 10, 1951 |

OTHER REFERENCES

Philips Technical Review, March 1951.
"The Electro-Analogue, page 257 to 271, An Apparatus for Studying Regulating System" by Janssen and Ensing.

Proc. of the IRE, vol. 35, #7; May 1947, "Analysis of Problems in Dynamics by Electronic Circuits" by Ragazzini, pages 444–452.

UNITED STATES PATENT OFFICE
Certificate of Correction

Patent No. 2,805,022                                September 3, 1957

Rulon G. Shelley

It is hereby certified that error appears in the printed specification of the above numbered patent requiring correction and that the said Letters Patent should read as corrected below.

Column 4, line 30, second equation, for "$\omega_j \bar{A}_{Bjs}$," read —$\omega_1 \bar{A}_{Bjs}$—.

Signed and sealed this 21st day of January 1958.

[SEAL]

Attest:
KARL H. AXLINE,
*Attesting Officer,*

ROBERT C. WATSON,
*Commissioner of Patents.*